United States Patent
Ogawa

[11] Patent Number: 5,899,585
[45] Date of Patent: * May 4, 1999

[54] COMPACT WIDE-ANGLE ZOOM LENS

[75] Inventor: Hideki Ogawa, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/889,453

[22] Filed: Jul. 8, 1997

[30] Foreign Application Priority Data

Jul. 11, 1996 [JP] Japan ..................... 8-182041

[51] Int. Cl.$^6$ ............... G02B 15/14; G03B 17/00
[52] U.S. Cl. ................................. 396/72; 359/689
[58] Field of Search ................ 396/72; 359/676, 359/689

[56] References Cited

U.S. PATENT DOCUMENTS

| | | | |
|---|---|---|---|
| 4,871,243 | 10/1989 | Ogawa et al. | 359/693 |
| 5,042,927 | 8/1991 | Ogawa et al. | 359/683 |
| 5,241,421 | 8/1993 | Endo et al. | 359/684 |
| 5,528,427 | 6/1996 | Tanaka et al. | 359/683 |
| 5,537,259 | 7/1996 | Ogawa | 359/684 |
| 5,568,321 | 10/1996 | Ogawa et al. | 359/676 |
| 5,576,890 | 11/1996 | Tanaka et al. | 359/686 |

FOREIGN PATENT DOCUMENTS

| | | |
|---|---|---|
| 4-19706 | 1/1992 | Japan . |
| 5-127084 | 5/1993 | Japan . |
| 7-77655 | 3/1995 | Japan . |

*Primary Examiner*—David M. Gray
*Assistant Examiner*—J. K. Han
*Attorney, Agent, or Firm*—Fitzpatrick, Cella, Harper & Scinto

[57] ABSTRACT

A zoom lens having, in order from an object side to an image side, a first lens unit of negative refractive power, a second lens unit of positive refractive power and a third lens unit of negative refractive power, the first lens unit and the second lens unit being axially moved to effect zooming, wherein the first lens unit comprises, in order from the object side to the image side, a positive first lens, a negative second lens of meniscus form having a strong concave surface facing the image side, a negative third lens of bi-concave form and a positive fourth lens of meniscus form having a convex surface facing the object side, and the third lens unit comprises, in order from the object side to the image side, a negative first lens of bi-concave form and a positive second lens, and wherein the zoom lens satisfies the following conditions:

$$0.8 < \beta_{2W} \cdot \beta_{2T} < 1.2$$

$$0.45 < |f_1|/f_T < 0.59$$

$$0.37 < f_2/f_T < 0.43$$

where $\beta_{2W}$ is an image magnification of the second lens unit in a wide-angle end, $\beta_{2T}$ is an image magnification of the second lens unit in a telephoto end, $f_T$ is a focal length of the zoom lens in the telephoto end, $f_1$ is a focal length of the first lens unit, and $f_2$ is a focal length of the second lens unit.

4 Claims, 5 Drawing Sheets

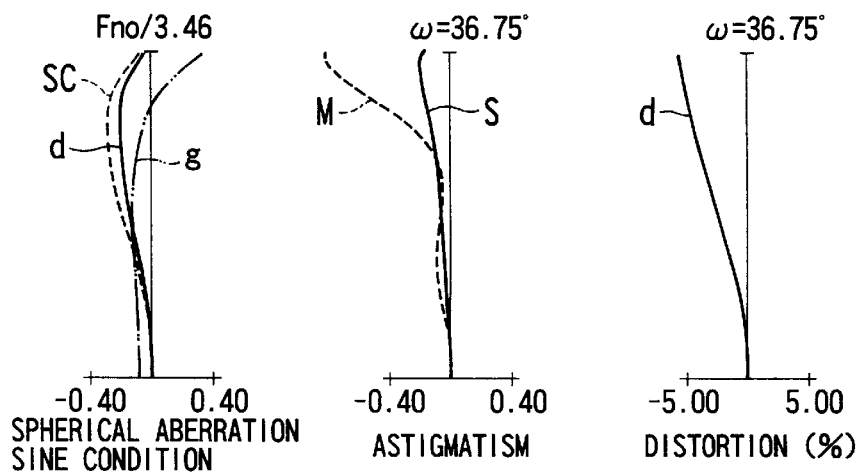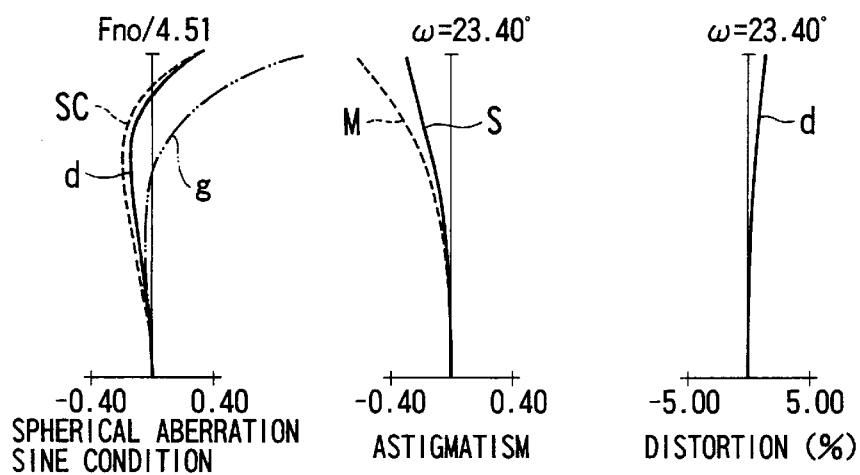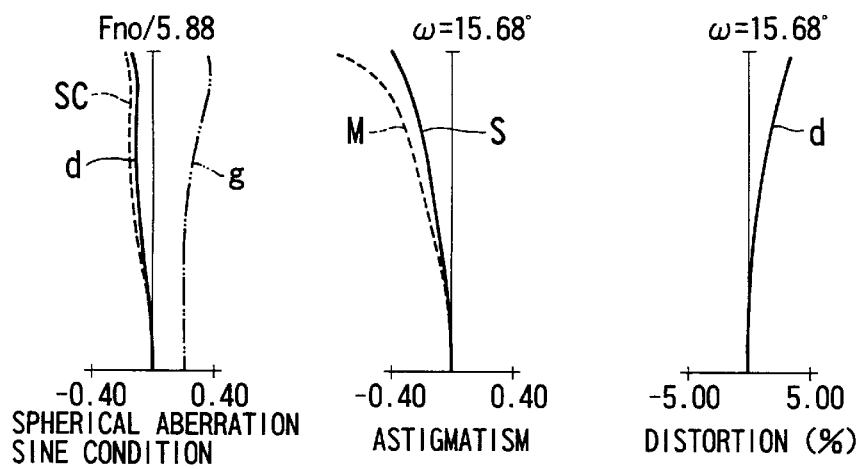

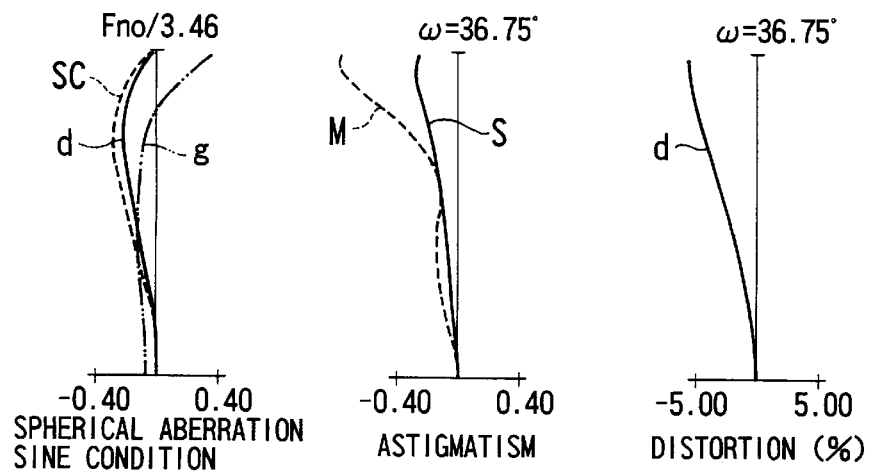
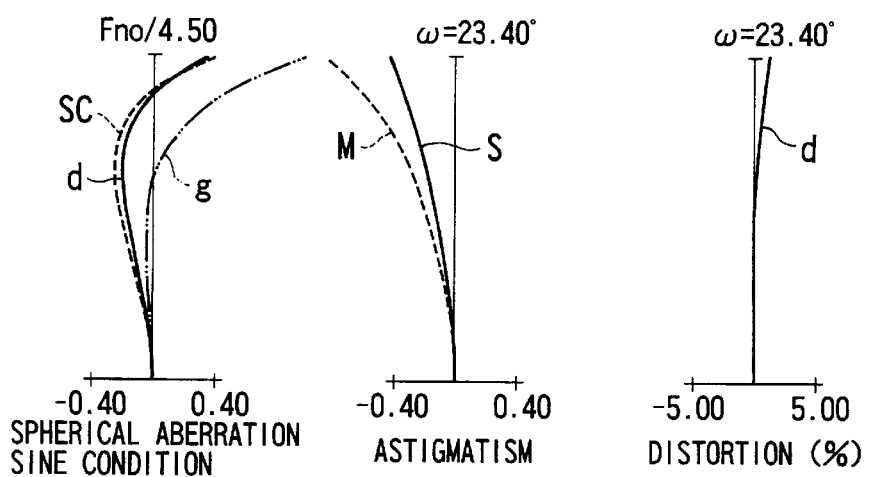
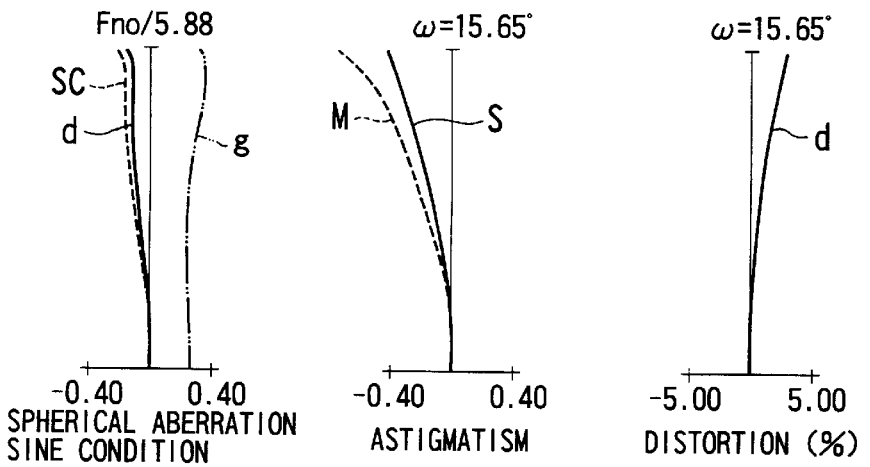

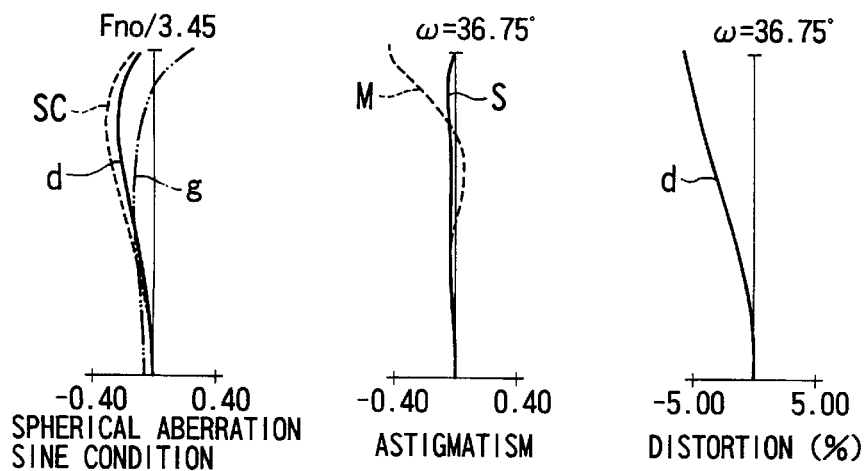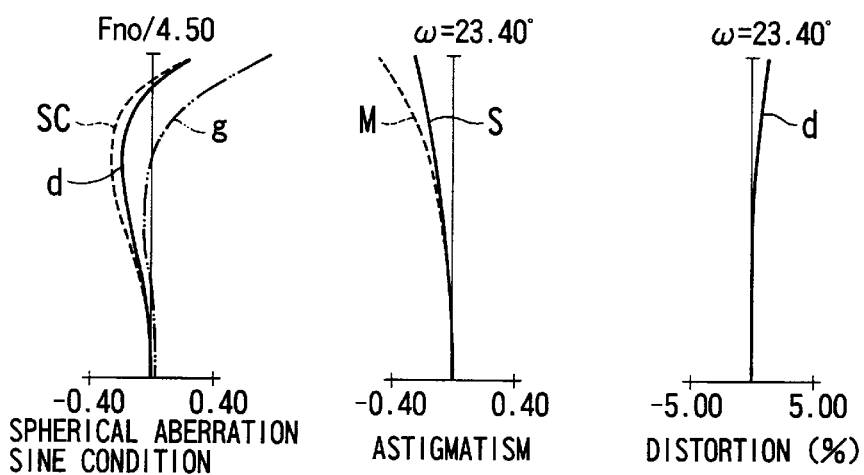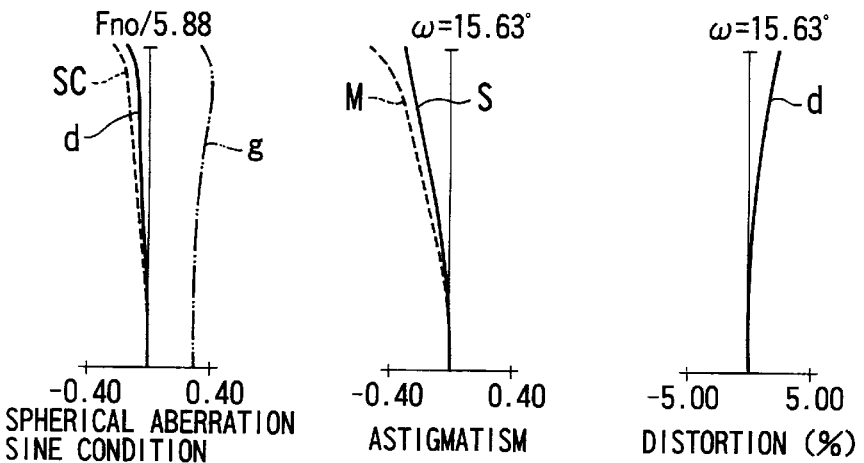

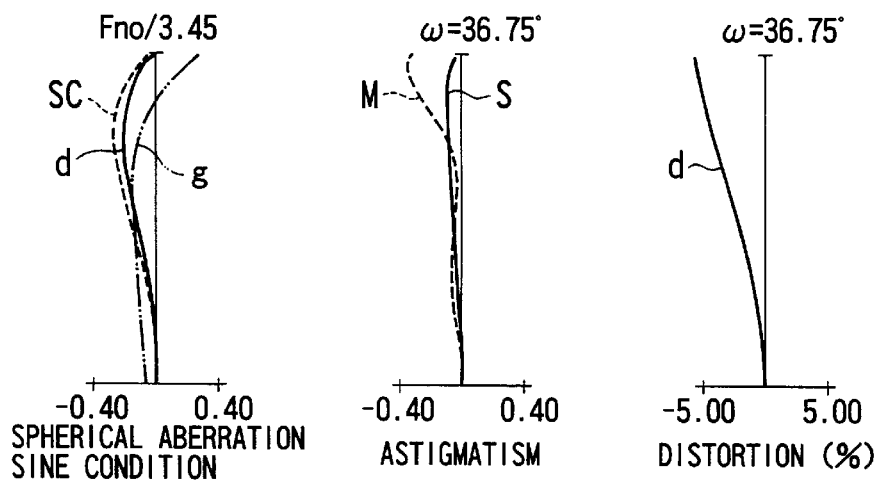
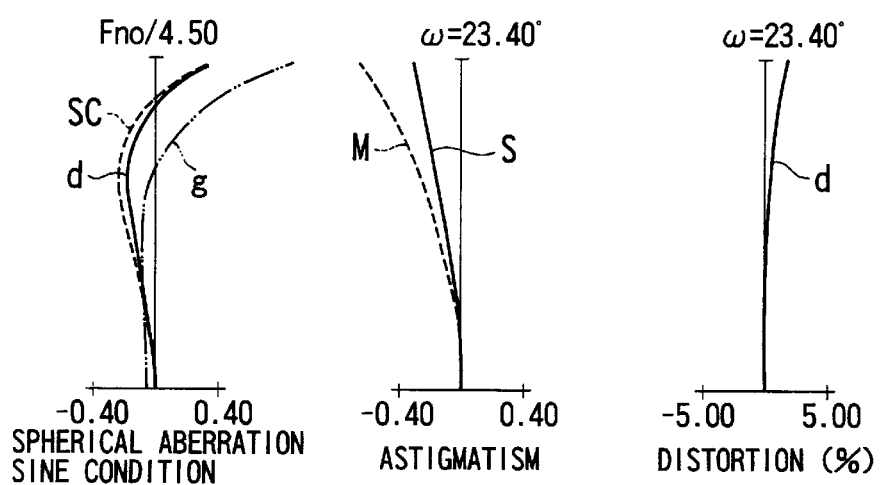
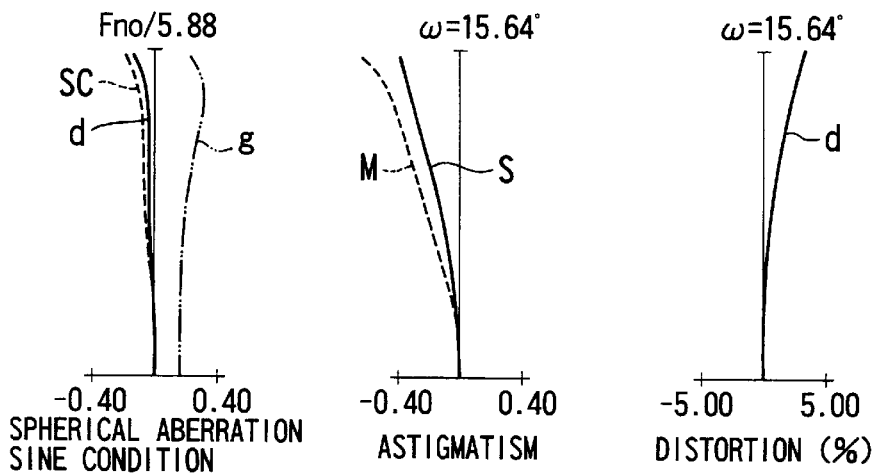

COMPACT WIDE-ANGLE ZOOM LENS

BACKGROUND OF THE INVENTION

1. Field of the Invention

This invention relates to zoom lenses and, more particularly, to zoom lenses having a high optical performance throughout the entire zooming range suited to photographic cameras or video cameras. Still more particularly, it relates to wide-angle zoom lenses of the negative-lens-unit lead type having three lens units with a relatively high range or a zoom ratio of about 2.5 to 3, while shortening the total length of the entire lens system to a compact form.

2. Description of Related Art

It has been known to provide a method of improving the compact form of the lens system by assuring a shortening of the total length of the entire lens system and a reduction of the diameter of the outer lens barrel. Zoom lenses for photography which employ such a method are disclosed in, for example, Japanese Laid-Open Patent Applications Nos. Hei 4-19706, Hei 5-127084 and Hei 7-77655.

Any of these zoom lenses is constructed with three lens units in total, comprising, in order from the object side, a first lens unit of negative refractive power, a second lens unit of positive refractive power and a third lens unit of negative refractive power. The first and second lens units are made movable for varying the focal length of the entire lens system.

Of these zoom lenses, the ones disclosed in Japanese Laid-Open Patent applications Nos. Hei 4-19706 and Hei 5-127084 have their ranges in a zoom ratio of about 2 strong, and, therefore, cannot be said to be the high range zoom lens. With the lens configuration remaining unchanged, when the range is extended, a great increase of the total length of the entire lens system results, so that a compact zoom lens could not be obtained.

Meanwhile, the one disclosed in Japanese Laid-Open Patent Application No. Hei 7-77655 has as high a range as about 3, while still shortening the total length to a compact form. However, the rules of lens design are not satisfactory. Therefore, this zoom lens cannot be said to have good enough optical performance.

BRIEF SUMMARY OF THE INVENTION

The invention is concerned with the zoom lens comprising three lens units of refractive powers of the predetermined signs as a whole. The refractive powers of the lens units and the form and the arrangement and construction of the constituent lenses are appropriately specified to obtain a lesser range of variation of aberrations with zooming and a shorter total length of the entire lens system. It is, therefore, an object of the invention to provide a zoom lens of improved compact form suited to photographic cameras or video cameras.

To attain the above object, in accordance with an aspect of the invention, there is provided a zoom lens which comprises, in order from an object side to an image side, a first lens unit of negative refractive power, a second lens unit of positive refractive power and a third lens unit of negative refractive power, the first lens unit and the second lens unit being axially moved to effect zooming, wherein the first lens unit comprises, in order from the object side to the image side, a positive first lens, a negative second lens of meniscus form having a strong concave surface facing the image side, a negative third lens of bi-concave form and a positive fourth lens of meniscus form having a convex surface facing the object side, and the third lens unit comprises, in order from the object side to the image side, a negative first lens of bi-concave form and a positive second lens, and wherein the zoom lens satisfies the following conditions:

$$0.8 < \beta_{2W} \cdot \beta_{2T} < 1.2 \tag{1}$$

$$0.45 < |f_1|/f_T < 0.59 \tag{2}$$

$$0.37 < f_2/f_T < 0.43 \tag{3}$$

where $\beta_{2W}$: an image magnification of the second lens unit in a wide-angle end;

$\beta_{2T}$: an image magnification of the second lens unit in a telephoto end;

$f_T$: a focal length of the zoom lens in the telephoto end;

$f_1$: a focal length of the first lens unit; and $f_2$: a focal length of the second lens unit.

Further objects and features of the invention will become apparent from the following detailed description of the preferred embodiment thereof taken in conjunction with the accompanying drawings.

BRIEF DESCRIPTION OF THE SEVERAL VIEWS OF THE DRAWING

FIGS. 2(A)-1 to 2(A)-3, FIGS. 2(B)-1 to 2(B)-3 and FIGS. 2(C)-1 to 2(C)-3 are graphic representations of the aberrations of the numerical example 1 of the invention.

FIGS. 3(A)-1 to 3(A)-3, FIGS. 3(B)-1 to 3(B)-3 and FIGS. 3(C)-1 to 3(C)-3 are graphic representations of the aberrations of the numerical example 2 of the invention.

FIGS. 4(A)-1 to 4(A)-3, FIGS. 4(B)-1 to 4(B)-3 and FIGS. 4(C)-1 to 4(C)-3 are graphic representations of the aberrations of the numerical example 3 of the invention.

FIGS. 5(A)-1 to 5(A)-3, FIGS. 5(B)-1 to 5(B)-3 and FIGS. 5(C)-1 to 5(C)-3 are graphic representations of the aberrations of the numerical example 4 of the invention.

In the block diagrams,

L1: a first lens unit,

L2: a second lens unit;

L3: a third lens unit; and

SP: a stop.

In the aberration curves,

S: a sagittal image focus;

M: a meridional image focus;

d: a spectral d-line;

g: a spectral g-line; and

SC: a sine condition.

DETAILED DESCRIPTION OF THE INVENTION

Hereinafter, a preferred embodiment of the invention will be described in detail with reference to the drawings.

Figure 1A:
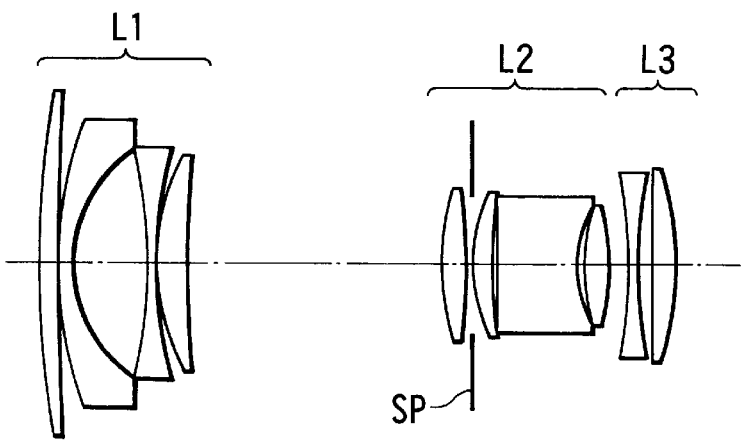
FIGS. 1(A) to 1(C) are longitudinal section views showing each of zoom lenses of numerical examples 1 to 4 of the invention.
Figure 1B:
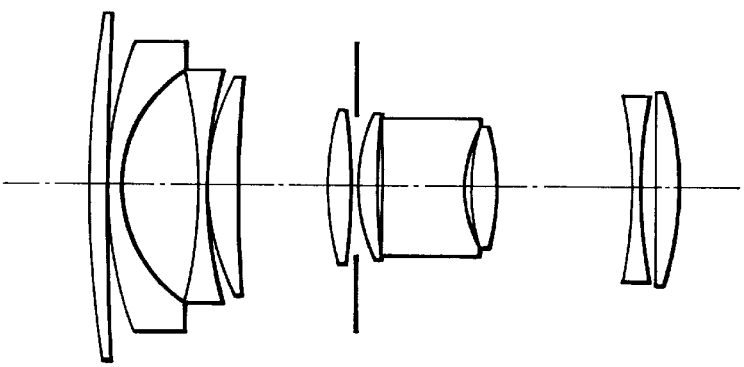
Figure 1C:
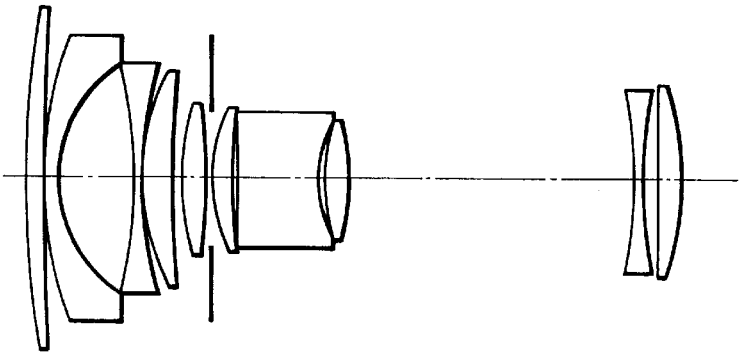

FIGS. 1(A) to 1(C) are longitudinal section views showing each of zoom lenses of numerical examples 1 to 4 according to the embodiment of the invention, with FIG. 1(A) in the wide-angle end, FIG. 1(B) in a middle focal length position and FIG. 1(C) in the telephoto end. FIGS. 2(A)-1 to 2(C)-3 through FIGS. 5(A)-1 to 5(C)-3 show the aberrations of the numerical examples 1 to 4, respectively. Of these, the ones of the figure numbers which are suffixed (A) are in the wide-angle end, the ones of the figure numbers which are suffixed (B) in the middle focal length position and the ones of the figure numbers which are suffixed (C) in the telephoto end.

Referring to FIGS. 1(A) to 1(C), reference character L1 denotes a first lens unit of negative refractive power. To compensate for the shift of an image plane with zooming, the first lens unit L1 axially moves in a locus convex toward the image side, as shown by an arrow. The first lens unit L1 also performs the focusing function. Reference character L2 denotes a second lens unit L2 of positive refractive power, which axially moves toward the object side monotonously as shown by an arrow, when zooming is effected from the wide-angle end to the telephoto end. Reference character L3 denotes a third lens unit L3 of negative refractive power, which is stationary. Reference character SP denotes an aperture stop.

In general, for the zoom lens composed of three lens units in the minus-plus-minus refractive power arrangement as in the present invention, in order to fulfill the requirements of shortening the total length of the entire lens system and of maintaining good stability of high optical performance throughout the entire zooming range at once, there is need to appropriately determine the refractive powers of the first and second lens units movable for zooming in relation to the entire lens system, the image magnification of the second lens unit, and the form and the construction and arrangement of the constituent lenses.

According to the embodiment of the invention, the rules for the refractive powers of the lens units, the lens configuration and the image magnification of the second lens unit are set forth as described before. By this arrangement, the variation of aberrations with zooming is corrected well, and the high optical performance is thus obtained. At the same time, the zoom lens is formed to a compact shape.

The technical significance of each of the above-described conditions (1) to (3) is explained below.

Most of the conventional 3-unit zoom lenses employ such a form that the total length of the entire lens system is made shorter when in the telephoto setting than in the wide-angle setting. In this case, the longitudinal length of the lens barrel becomes minimum in the telephoto setting. If, when being used in the wide-angle setting, the zoom lens is accidentally shocked from the front, the stress will damage the zoom cam directly, causing eventual occurrence of malfunctions.

Hence, it is preferred to make a lens configuration such that all the lens units are wrapped in the fixed barrel at the longest of the varied sizes with zooming so that the lens system does not suffer the damage. In other words, the zoom lens configuration to be used preferably assures a shortening of the longest of the varied total lengths with zooming. It is ideal that the total lengths for the wide-angle and telephoto ends of the entire lens system come to be almost equal.

In the zoom lenses composed of three lens units as in the present invention, in a case where the total lengths take almost equal values at the wide-angle and telephoto settings, mainly the second lens unit alone changes its axial position between the wide-angle and the telephoto ends, and the positions of the image plane become the same. In other words, the second lens unit lies in almost conjugate positions for the wide-angle and telephoto settings. In this instance, letting the image magnifications of the second lens unit in the wide-angle end and the telephoto end be denoted by $\beta_{2W}$ and $\beta_{2T}$, respectively, there is obtained the following relation:

$$\beta_{2W} \cdot \beta_{2T} \approx 1 \quad \text{(a).}$$

The condition (1) is derived from the equation (a) by making a range of 20% thereof as acceptable. Satisfaction of the condition (a) assures a shortening of the maximum total length of the entire lens system in order to achieve improvements of the compact form of the entire lens system. When the condition (1) is violated, it becomes difficult to efficiently improve the compact form of the entire lens system.

The condition (2) is concerned with the refractive power of the first lens unit and has an aim chiefly to lessen the variation of aberrations with zooming.

Now, letting the zoom ratio Z be defined by $Z=f_T/f_W$ where $f_T$ and $f_W$ are the focal lengths of the entire lens system in the telephoto end and the wide-angle end, respectively, since a lens unit that contributes to a variation of the focal length is the second lens unit, there is obtained the relation: $Z=\beta_{2T}/\beta_{2W}$.

On calculation by putting $\beta_{2W} \cdot \beta_{2T} \approx 1$, therefore, the following relation is obtained:

$$\beta_{2T} \approx -\sqrt{Z}. \quad \text{(b)}$$

Also, denoting the image magnification of the third lens unit by $\beta_3$, the following relation is obtained:

$$f_T = f_1 \cdot \beta_{2T} \cdot \beta_3.$$

From this relation and the equation (b), the following equation is obtained:

$$\frac{f_1}{f_T} = \frac{1}{\beta_{2T} \cdot \beta_3} \approx \frac{1}{\sqrt{Z} \cdot \beta_3}. \quad \text{(c)}$$

As is apparent from the equation (c), the ratio of the focal length $f_1$ of the first lens unit to the focal length $f_T$ of the entire lens system in the telephoto end can be expressed approximately by using the zoom ratio Z and the image magnification $\beta_3$ of the third lens unit.

From the equation (c), in the case of a zoom lens whose zoom ratio is of the order of 2.5 to 3, it is recommended to make the first lens unit have an adequate negative refractive power as determined based on the value of "$\beta_{2W} \cdot \beta_{2T}$" in the condition (1) and the value of $\beta_3$ corresponding to the condition (2).

When the refractive power of the first lens unit becomes weaker than the upper limit of the condition (2), that is, when the image magnification $\beta_3$ becomes smaller than "1", the total length of the entire lens system increases objectionably.

Also, in the case of using the first lens unit for focusing, for an object at the minimum distance, the amount of forward movement of the first lens unit increases greatly. To secure the desired corner illumination of the image frame, the outer diameter of the first lens unit increases objectionably.

Conversely, when the refractive power of the first lens unit is too strong beyond the lower limit of the condition (2), all the aberrations the first lens unit produces increase, which are difficult to correct in good balance by using the other lens units.

The condition (2) may be more preferably altered as follows:

$$0.5 < |f_1|/f_T < 0.55.$$

Next, the condition (3) is concerned with the refractive power of the second lens unit and has such an aim that, upon satisfaction of the conditions (1) and (2), a good compromise is made between facilitation of the correction of aberrations and the minimization of the bulk and size of the entire lens system.

When the upper limit of the condition (3) is exceeded, as this means that the refractive power of the second lens unit is too weak, the required amount of movement for the predetermined value of the zoom ratio of the second lens unit is caused to increase greatly. As a result, the total length of the entire lens system is increased objectionably.

Conversely, when the lower limit of the condition (3) is exceeded, as this means that the refractive power of the second lens unit is too strong, all the aberrations the second lens unit produces are increased greatly, which are difficult to correct in good balance by any design of the other lens units.

Particularly, in the wide-angle end, under-correction of spherical aberration results. At the same time, comatic aberrations, too, deteriorates. Also, the field curvature remains worse throughout the entire zooming range.

Besides these, according to the invention, upon satisfaction of the condition (3), there is even more room for further improvements of the optical performance. For this purpose, it is preferable to satisfy the following condition:

$$0.02 < f_2/|f_3| < 0.085 \quad (4).$$

The condition (4) is concerned with the ratio of the focal length of the second lens unit to the focal length of the third lens unit. When the refractive power of the third lens unit is too strong as exceeding the upper limit of the condition (4), all the aberrations the third lens unit produces are increased. In addition, the image magnification of the third lens unit becomes larger, which, in turn, causes enlargement of the residual aberrations of the composite system of the first and second lens units. Further, the focal length of the composite system of the first and second lens units is caused to shift toward the wide-angle side. By the increased amounts of the refractive powers of the first and second lens units, the residual aberrations of the composite system of the first and second lens units are increased, thus complicating the problem of correcting aberrations.

Conversely, when the lower limit of the condition (4) is exceeded, as this means that the refractive power of the third lens unit is too weak, the image magnification of the third lens unit decreases accordingly. Thus, as described before, the total length of the entire lens system tends to increase.

The condition (4) may be more preferably altered as follows:

$$0.049 < f_2/|f_3| < 0.08.$$

According to the invention, to further improve the aberrations, it is preferable to make the second lens unit comprising, in order from the object side to the image side, a positive first lens of bi-convex form, a positive second lens of meniscus form having a convex surface facing the object side, a negative third lens of bi-concave form, and a positive fourth lens of bi-convex form. In particular, the spherical aberration of the first lens unit varies in such a direction as to be over-corrected, as zooming goes from the wide-angle end to the telephoto end. To correct this aberration well, the second lens unit is constructed, as described above, in such a way as to produce the spherical aberration which varies in such a direction as to be under-corrected, while keeping the hold of a balance with the variation of the other aberrations.

In the invention, the reason why the first lens unit is constructed with such constituent lenses in such arrangement as described before is mainly to suppress the tendency of the spherical aberration to vary toward the over-correction which is ever intensified when zooming goes from the wide-angle end to the telephoto end. This feature also serves to correct well the variation of spherical aberration as the first lens unit moves to effect focusing to shorter object distances.

Also, the first lens in the first lens unit is made positive in refractive power, so that the distortion, too, is corrected well. Further, the reason why the third lens unit is constructed with such constituent lenses in such arrangement as described before is, mainly, to correct well the residual field curvature, since, after it has been varied in such a direction as to be under-corrected by the first lens unit, the second lens unit reverses the direction to over-correction. To aim at increasing the degree of freedom on the correction of aberrations, the first lens of the third lens unit and the second lens of the third lens unit are not cemented together, but rather left in separation.

Also, the first and second lenses in the third lens unit may be spaced so that the overall thickness of the third lens unit becomes not too much large. If so, the front principal point of the third lens unit can be shifted to a more front position than when cemented together.

Accordingly, for the third lens unit to obtain a predetermined image magnification, the required refractive power of the third lens unit can be weakened. Moreover, it becomes easier to correct aberrations within the third lens unit.

In other words, letting the air separation between the first and second lenses in the third lens unit be denoted by $d_{31}$ and the focal length of the entire lens system in the telephoto end be denoted by $f_T$, it is preferable to satisfy the following condition:

$$0.0025 < d_{31}/f_T < 0.0625 \quad (5)$$

When the separation is too wide as exceeding the upper limit of the condition (5), the overall length of the third lens unit becomes thick, causing the total length of the entire lens system to increase objectionably.

Conversely, when the separation is too narrow as exceeding the lower limit of the condition (5), it becomes impossible to bring the front principal point of the third lens unit to a sufficiently front position. So, this should be avoided.

Next, the numerical examples 1 to 4 of the invention are shown. In the numerical data for the examples 1 to 4, ri is the radius of curvature of the i-th lens surface, when counted from the object side, di is the i-th axial thickness or separation, when counted from the object side, and ni and vi are respectively the refractive index and Abbe number of the glass of the i-th lens element, when counted from the object side.

| (Numerical Example 1) | | | |
|---|---|---|---|
| f = 28.98–77.08 | Fno = 1:3.46–5.88 | 2ω= 73.49°–31.36° | |
| r1 = 117.525 | d1 = 2.70 | n1 = 1.51633 | v1 = 64.1 |
| r2 = 689.019 | d2 = 0.15 | | |
| r3 = 57.304 | d3 = 1.50 | n2 = 1.70154 | v2 = 41.2 |
| r4 = 17.459 | d4 = 9.79 | | |
| r5 = −64.591 | d5 = 1.30 | n3 = 1.62299 | v3 = 58.2 |
| r6 = 54.489 | d6 = 0.17 | | |
| r7 = 31.274 | d7 = 3.82 | n4 = 1.76182 | v4 = 26.5 |
| r8 = 160.062 | d8 = Variable | | |
| r9 = 32.699 | d9 = 2.98 | n5 = 1.63854 | v5 = 55.4 |
| r10 = −89.601 | d10 = 0.99 | | |
| r11 = Stop | d11 = 0.20 | | |
| r12 = 22.321 | d12 = 2.17 | n6 = 1.66672 | v6 = 48.3 |
| r13 = 58.770 | d13 = 0.98 | | |
| r14 = −122.838 | d14 = 10.46 | n7 = 1.78472 | v7 = 25.7 |
| r15 = 17.636 | d15 = 0.89 | | |
| r16 = 34.854 | d16 = 2.67 | n8 = 1.58144 | v8 = 40.8 |
| r17 = −37.818 | d17 = Variable | | |
| r18 = −64.438 | d18 = 1.30 | n9 = 1.63854 | v9 = 55.4 |
| r19 = 83.202 | d19 = 1.94 | | |
| r20 = −709.402 | d20 = 2.77 | n10 = 1.66672 | v10 = 48.3 |
| r21 = −42.415 | | | |

| Variable | Focal Length | | |
|---|---|---|---|
| Separation | 28.98 | 50.00 | 77.08 |
| d8 | 32.88 | 11.61 | 1.31 |
| d17 | 3.01 | 17.95 | 37.21 |

(Numerical Example 2)

| | | | |
|---|---|---|---|
| f = 28.98–77.24 | Fno = 1:3.46–5.88 | 2ω = 73.49°–31.30° | |
| r1 = 121.258 | d1 = 2.70 | n1 = 1.58913 | v1 = 61.2 |
| r2 = 562.347 | d2 = 0.15 | | |
| r3 = 57.493 | d3 = 1.50 | n2 = 1.70154 | v2 = 41.2 |
| r4 = 17.462 | d4 = 9.70 | | |
| r5 = −68.048 | d5 = 1.30 | n3 = 1.60311 | v3 = 60.7 |
| r6 = 53.454 | d6 = 0.52 | | |
| r7 = 31.165 | d7 = 3.61 | n4 = 1.76182 | v4 = 26.5 |
| r8 = 122.647 | d8 = Variable | | |
| r9 = 32.461 | d9 = 2.98 | n5 = 1.63854 | v5 = 55.4 |
| r10 = −92.028 | d10 = 1.01 | | |
| r11 = Stop | d11 = 0.20 | | |
| r12 = 22.468 | d12 = 2.28 | n6 = 1.66672 | v6 = 48.3 |
| r13 = 58.774 | d13 = 1.00 | | |
| r14 = −122.788 | d14 = 10.49 | n7 = 1.78472 | v7 = 25.7 |
| r15 = 17.495 | d15 = 0.89 | | |
| r16 = 33.488 | d16 = 2.70 | n8 = 1.58144 | v8 = 40.8 |
| r17 = −38.036 | d17 = Variable | | |
| r18 = −65.881 | d18 = 1.30 | n9 = 1.65844 | v9 = 50.9 |
| r19 = 83.201 | d19 = 0.73 | | |
| r20 = 407.244 | d20 = 3.48 | n10 = 1.54814 | v10 = 45.8 |
| r21 = −40.820 | | | |

| Variable | Focal Length | | |
|---|---|---|---|
| Separation | 28.98 | 50.00 | 77.24 |
| d8 | 33.01 | 11.68 | 1.32 |
| d17 | 3.02 | 17.92 | 37.22 |

(Numerical Example 3)

| | | | |
|---|---|---|---|
| f = 28.98–77.36 | Fno = 1:3.45–5.88 | 2ω = 73.49°–31.25° | |
| r1 = 123.832 | d1 = 2.70 | n1 = 1.58913 | v1 = 61.2 |
| r2 = 419.833 | d2 = 0.15 | | |
| r3 = 45.002 | d3 = 1.50 | n2 = 1.70154 | v2 = 41.2 |
| r4 = 17.317 | d4 = 10.48 | | |
| r5 = −67.469 | d5 = 1.30 | n3 = 1.63854 | v3 = 55.4 |
| r6 = 46.156 | d6 = 0.34 | | |
| r7 = 30.336 | d7 = 4.28 | n4 = 1.72825 | v4 = 28.5 |
| r8 = 190.281 | d8 = Variable | | |
| r9 = 32.896 | d9 = 2.70 | n5 = 1.69680 | v5 = 55.5 |
| r10 = −169.409 | d10 = 1.15 | | |
| r11 = Stop | d11 = 0.00 | | |
| r12 = 20.953 | d12 = 2.50 | n6 = 1.65160 | v6 = 58.5 |
| r13 = 63.706 | d13 = 0.84 | | |
| r14 = −225.623 | d14 = 8.29 | n7 = 1.74077 | v7 = 27.8 |
| r15 = 16.291 | d15 = 1.22 | | |
| r16 = 45.410 | d16 = 2.36 | n8 = 1.57501 | v8 = 41.5 |
| r17 = −40.133 | d17 = Variable | | |
| r18 = −54.996 | d18 = 1.30 | n9 = 1.65844 | v9 = 50.9 |
| r19 = 82.970 | d19 = 0.38 | | |
| r20 = 130.239 | d20 = 3.66 | n10 = 1.51742 | v10 = 52.4 |
| r21 = −37.937 | | | |

| Variable | Focal Length | | |
|---|---|---|---|
| Separation | 28.98 | 50.00 | 77.36 |
| d8 | 34.01 | 12.05 | 1.34 |
| d17 | 3.19 | 18.05 | 37.39 |

(Numerical Example 4)

| | | | |
|---|---|---|---|
| f = 28.98–77.3 | Fno = 1:3.45–5.88 | 2ω = 73.49°–31.27° | |
| r1 = 91.149 | d1 = 2.84 | n1 = 1.58913 | v1 = 61.2 |
| r2 = 231.012 | d2 = 0.15 | | |
| r3 = 48.700 | d3 = 1.50 | n2 = 1.70154 | v2 = 41.2 |
| r4 = 17.387 | d4 = 10.45 | | |
| r5 = −71.531 | d5 = 1.30 | n3 = 1.62960 | v3 = 57.4 |
| r6 = 44.903 | d6 = 0.00 | | |
| r7 = 29.443 | d7 = 4.29 | n4 = 1.74753 | v4 = 27.7 |
| r8 = 147.990 | d8 = Variable | | |
| r9 = 30.165 | d9 = 2.93 | n5 = 1.63754 | v5 = 55.6 |
| r10 = −112.228 | d10 = 1.05 | | |
| r11 = Stop | d11 = 0.00 | | |
| r12 = 21.225 | d12 = 2.48 | n6 = 1.63258 | v6 = 56.7 |
| r13 = 70.613 | d13 = 0.96 | | |
| r14 = −129.150 | d14 = 7.89 | n7 = 1.74217 | v7 = 27.7 |
| r15 = 16.579 | d15 = 1.13 | | |
| r16 = 43.860 | d16 = 2.38 | n8 = 1.56771 | v8 = 42.4 |
| r17 = −38.611 | d17 = Variable | | |
| r18 = −46.910 | d18 = 1.30 | n9 = 1.66533 | v9 = 51.3 |
| r19 = 91.756 | d19 = 1.20 | | |
| r20 = 412.132 | d20 = 3.46 | n10 = 1.65268 | v10 = 50.8 |
| r21 = −36.343 | | | |

| Variable | Focal Length | | |
|---|---|---|---|
| Separation | 28.98 | 50.00 | 77.30 |
| d8 | 33.68 | 11.92 | 1.33 |
| d17 | 3.26 | 18.14 | 37.46 |

TABLE 1

| Condition | Numerical Example | | | |
|---|---|---|---|---|
| Factor | 1 | 2 | 3 | 4 |
| (1) $\beta_{2W} \cdot \beta_{2T}$ | 1.083 | 1.079 | 1.047 | 1.058 |
| (2) $|f_1|/f_T$ | 0.517 | 0.513 | 0.537 | 0.540 |
| (3) $f_2/f_T$ | 0.419 | 0.418 | 0.423 | 0.421 |
| (4) $f_2/|f_3|$ | 0.057 | 0.077 | 0.051 | 0.022 |
| (5) $d_{31}/f_T$ | 0.0252 | 0.0095 | 0.0049 | 0.0155 |

It will be appreciated that, according to the invention applied to the 3-unit type of zoom lens, the rules of design for the refractive powers of the lens units, the lens configuration and the image magnifications for the wide-angle and telephoto ends of the second lens unit are set forth as described above, thus achieving a zoom lens whose total length is shortened to improve the compact form, while still permitting reduction of the variation of aberrations with zooming and focusing for good stability of optical performance throughout the entire zooming range and throughout the entire focusing range.

I claim:

1. A zoom lens comprising, in order from an object side to an image side, a first lens unit of negative refractive power, a second lens unit of positive refractive power and a third lens unit of negative refractive power, said first lens unit and said second lens unit being axially moved to effect zooming, wherein said first lens unit comprises, in order from the object side to the image side, a positive first lens, a negative second lens of meniscus form having a strong concave surface facing the image side, a negative third lens of bi-concave form and a positive fourth lens of meniscus form having a convex surface facing the object side, and said third lens unit comprises, in order from the object side to the image side, a negative first lens of bi-concave form and a positive second lens, and wherein said zoom lens satisfies the following conditions:

$$0.8 < \beta_{2W} \cdot \beta_{2T} < 1.2$$

$$0.45 < |f_1|/f_T < 0.59$$

$$0.37 < f_2/f_T < 0.43$$

where
- $\beta_{2W}$ is an image magnification of said second lens unit in a wide-angle end,
- $\beta_{2T}$ is an image magnification of said second lens unit in a telephoto end,
- $f_T$ is a focal length of said zoom lens in the telephoto end,
- $f_1$ is a focal length of said first lens unit, and
- $f_2$ is a focal length of said second lens unit.

2. A zoom lens according to claim 1, further satisfying the following condition:

$$0.02 < f_2/|f_3| < 0.085$$

where $f_3$ is a focal length of said third lens unit.

3. A zoom lens according to claim 1 or 2, wherein said second lens unit comprises, in order from the object side to the image side, a positive first lens of bi-convex form, a positive second lens of meniscus form having a convex surface facing the object side, a negative third lens of bi-concave form and a positive fourth lens of bi-convex form.

4. A zoom lens comprising, in order from an object side to an image side, a first lens unit of negative refractive power, a second lens unit of positive refractive power and a third lens unit of negative refractive power, said first lens unit and said second lens unit being axially moved to effect zooming, wherein said first lens unit comprises, in order from the object side to the image side, a positive first lens, a negative second lens of meniscus form having a strong concave surface facing the image side, a negative third lens of bi-concave form and a positive fourth lens of meniscus form having a convex surface facing the object side, and said third lens unit comprises, in order from the object side to the image side, a negative first lens of bi-concave form and a positive second lens, and wherein said zoom lens satisfies the following conditions:

$$0.8 < \beta_{2W} \cdot \beta_{2T} < 1.2$$

$$0.45 < |f_1|/f_T < 0.59$$

where
- $\beta_{2W}$ is an image magnification of said second lens unit in a wide-angle end,
- $\beta_{2T}$ is an image magnification of said second lens unit in a telephoto end,
- $f_T$ is a focal length of said zoom lens in the telephoto end, and
- $f_1$ is a focal length of said first lens unit.

* * * * *